United States Patent

[11] 3,603,616

[72] Inventor Joseph B. Smith
 Cleveland, Ohio
[21] Appl. No. 852,513
[22] Filed Aug. 22, 1969
[45] Patented Sept. 7, 1971
[73] Assignee The Pipe Line Development Company
 Cleveland, Ohio

[54] FLANGE COUPLING REPAIR RING
 5 Claims, 6 Drawing Figs.
[52] U.S. Cl. .................................................... 285/15,
 138/97, 285/27, 285/286, 285/294, 285/363
[51] Int. Cl. ...................................................... F16l 55/18
[50] Field of Search ............................................ 285/24, 27,
 363, 286, 94, 15, 16, 294, 297, 405; 138/97, 99;
 24/279, 284

[56] References Cited
UNITED STATES PATENTS
3,152,816 10/1964 Smith .......................... 285/15
3,467,141 9/1969 Smith .......................... 138/97

Primary Examiner—Dave W. Arola
Attorney—McNenny, Farrington, Pearne & Gordon

ABSTRACT: Locating and aligning lug means are provided for a type of coupling used in the repair of leaking flanged pipe joints which index the coupling to the center of the joint, permitting the coupling length to be independent of the length of the joint.

INVENTOR.
JOSEPH B. SMITH
BY
McNENNY, FARRINGTON, PEARNE & GORDON
ATTORNEYS

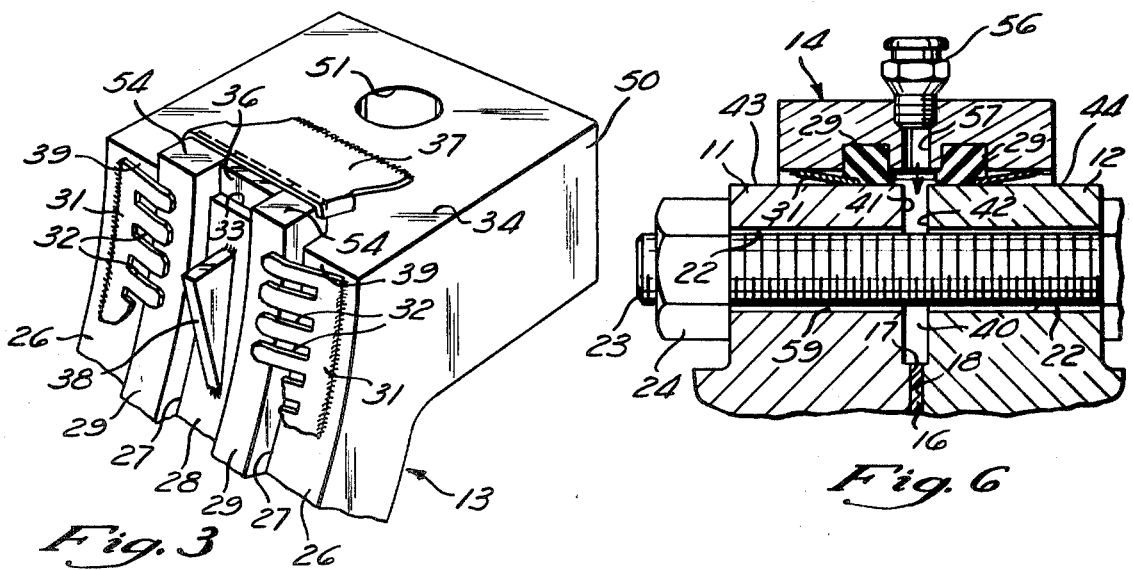

3,603,616

FLANGE COUPLING REPAIR RING

BACKGROUND OF THE INVENTION

This invention relates to an apparatus for sealing and repairing leaking pipe joints and, more particularly, it relates to a sealing and repair coupling adapted to stop fluid leakage in a flanged pipe joint.

This invention has utility in industrial pipe systems in situations where a flanged pipe joint has developed a leak and where it is inconvenient or nonadvantageous to disassemble the joint to replace a seal which has become defective or to make other more or less permanent repairs, In cases where a particular joint would require substantial labor for its disassembly, it may often be more economical to employ a repair coupling such as provided by this invention. In other cases, a flange joint leak may develop in a critical pipe system of an industrial plant where it is impossible to disassemble the joint for repair without curtailing plant operations. In such instances an external sealing coupling such as provided by this invention, which may be easily positioned and installed around the leaking flange joint to seal it without disassembly, may be used.

PRIOR ART

The present invention concerns an improvement in a type of flange coupling repair ring such as that shown in my copending U.S. Pat. applications Ser. No. 608,090, filed Jan. 9, 1967, now Pat. No. 3,467,141 and Ser. No. 746,162, filed July 19, 1968 now Pat No. 3,550,638. As shown therein, a type of coupling repair ring has been provided which comprises a pair of semicylindrical segments which are fastened together around a leaking joint. Each semicylindrical segment carries a pair of semicylindrical segments which are fastened together around a leaking joint. Each semicylindrical segment carries a pair of gaskets which engage the outer cylindrical surfaces of adjoining flanges to form a circumferential seal about the flange joint. Each semicylindrical segment is provided with a set of fittings for admitting pressurized fluid sealant into the joint after it has been sealed by the gaskets, Fluid sealant is forced into the annular zone of the flange joint enclosed by the sealing and repair coupling. The sealant forms a more permanent seal than that provided by the coupling gaskets. Additionally, the sealant seals leakage paths formed by any clearance between the flange fastening bolts and their associated holes. A more detailed description of this type of repair coupling and its applications may be found in my above-mentioned copending patent applications.

My older type of repair coupling is provided with locating members which cooperate with the outer end surfaces of the pipe flanges to axially align the repair coupling to the joint In this older type of coupling the locating members extend radially inward from the end surfaces of the coupling. While this arrangement provides satisfactory alignment between the coupling and flange, it requires that the coupling length be substantially the same as the length of the outer portion of the flange joint.

Ordinarily in high-pressure systems, pipe flanges are are relatively thick. When a repair coupling is correspondingly long, it may be unnecessarily bulky. The repair coupling need not necessarily extend the full axial length of the flange joint to effectively seal the actual joint line. Any unnecessary bulk adds to material, machining, and shipping costs, and adds to any installation difficulties, particularly in larger pipe sizes.

Moreover, when a repair coupling must be matched in diameter and length to a flange joint, it may be necessary to carry an inventory of a multiplicity of repair couplings for a given flange diameter where various flange lengths exist.

SUMMARY OF THE INVENTION N

This invention provides an improvement over earlier repair couplings and provides a coupling which may readily be aligned and fastened over a flanged pipe joint and which does not depend for its alignment on the length of the joint. The sealing and repair coupling of this invention includes a pair of semicylindrical segments each providing locating lug means to facilitate their installation. The locating lug means are adapted to be inserted into a normally existing space between the adjoining pipe flanges. The sealing and repair coupling of this invention is thereby aligned to the center of the flange joint and its alignment is substantially independent of the axial lengths of the flanges.

Since the alignment of the repair coupling is not dependent on the length or thickness of a flange, the length of the repair coupling may be minimized for economy and installation efficiency. The use of a minimum coupling length lowers material and machining or forming costs. A minimum coupling length is likewise desirable because of a direct reduction in bulk which must otherwise be handled by a workman when the coupling is installed. Moreover, necessary inventory is reduced, since the same repair coupling may be used on flanges having various lengths and a common diameter.

The locating lug means of this invention, moreover, allow each of the semicylindrical segments to be quickly and easily aligned to a flange joint. The locating lug means are arranged to enter the central space between the flanges at an early point in the radial motion of the segments during their installation. Upon entrance of the locating lug means into this central space, the coupling segments are easily guided into a proper position around the flanges to ensure a perfect seal.

BRIEF DESCRIPTION OF THE DRAWINGS

FIG. 3 is a fragmentary, perspective view of one portion of the repair coupling shown in FIG. 1.

FIG. 4 is a fragmentary, cross-sectional view, the plane of the section being indicated by the line 4—4 in FIG. 1.

FIG. 5 is a fragmentary, cross-sectional view, similar to that shown in FIG. 1 but showing a portion of the repair coupling of this invention being used to seal a flange joint somewhat shorter in length than the joint shown in FIG. 4.

FIG. 6 is a fragmentary, cross-sectional view, the plane of the section being indicated by the line 6—6 in FIG. 1.

DESCRIPTION OF THE PREFERRED EMBODIMENT

Figure 1:
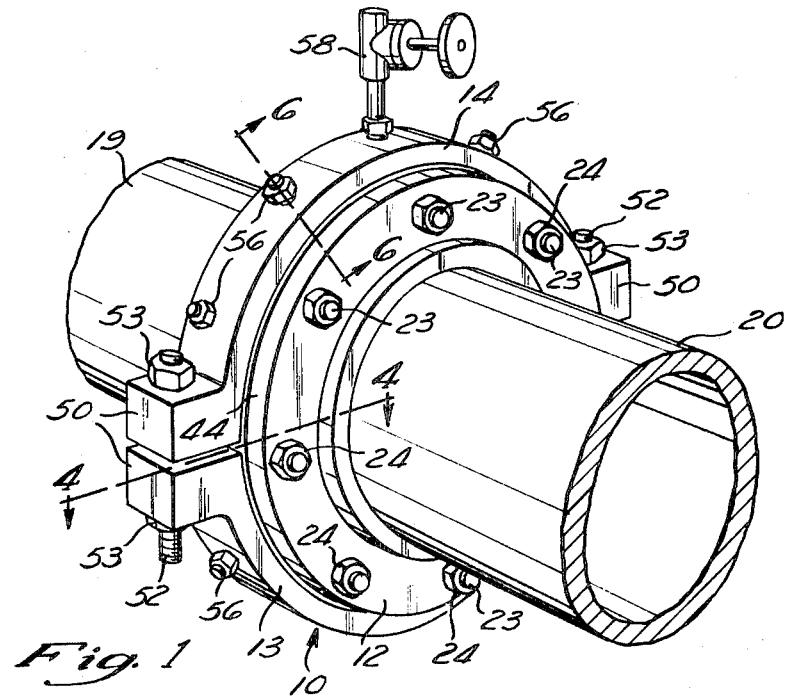
FIG. 1 is a perspective view of a repair coupling in accordance with this invention, showing the coupling installed on a flanged and bolted pipe joint.

Referring now to the figures, a sealing and repair coupling 10 is shown mounted on a flange joint formed by adjoining pipe flanges 11 and 12. The repair coupling 10 of this invention is intended to seal leaks in pipe flange joints which include a separation or space between the opposing inner faces of the joined flanges, such as provided by ASA raised face flanges.

The opposed flanges 11 and 12 and their associated pipes 19 and 20 are secured together by a plurality of threaded fastening studs 23 extending through a series of aligned flange holes 22 and nuts 24. The pipe flanges 11 and 12 capture a gasket 16 between the inner raised portions 17 and 18 of their adjacent faces. The sealing and repair coupling 10 of this invention is provided to stop radial fluid leakage past the gasket 16.

Figure 2:
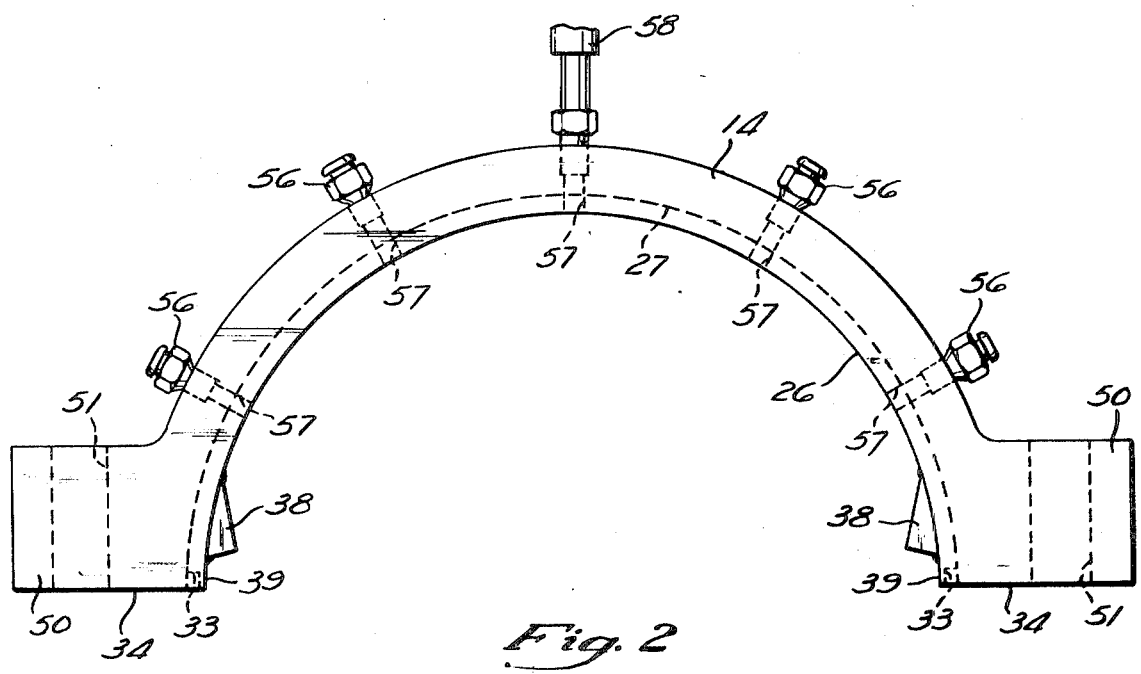
FIG. 2 is an elevational view of one portion of the repair coupling shown in FIG. 1, showing that portion disassembled from the flanged pipe joint.

The sealing and repair coupling 10 comprises a pair of semicylindrical segments 13 and 14 which are substantially identical and symmetrical. FIG. 2 shows the outline of the upper segment 14 as viewed from a direction which corresponds to the pipe axis upon installation. A semicylindrical segment 13 is provided with a cylindrical inner surface 26 as shown in FIG. 3. A pair of arcuate grooves 27 extending along the cylindrical inner surface 26 define a central land 28.

The arcuate grooves 27 are adapted to carry a pair of gasket sections 29. The gasket sections 29 are retained in the grooves 27 by a pair of girdering sections 31 which are welded to the inner cylindrical surface 26. Each girdering section 31 is provided with a series of slots 32 which allow the section 31 to decrease its radius when the segment 13 is tightened over a flange joint. A cross recess or slot 33 interconnects the arcuate grooves 27 at an end face 34 of the segment 13. A cross gasket 36 is provided in the cross recess 33. The cross gasket 36 is retained in the cross recess 33 by a gasket retaining plate 37 which is welded to the end face 34 of the segment 13.

To seal a fluid leak the semicylindrical repair segments 13 and 14 are positioned around the pipe flanges 11 and 12. Locating lug means 38 are provided near each arcuate end 39 of the segments 13 and 14 to facilitate the alignment and proper positioning of the segments to the flange joint. As shown in FIGS. 3, 4, and 5, the locating lug means are welded to the central land 28 of the inner cylindrical surface 26 between the gasket grooves 27 adjacent each end 39 of each repair segment.

As shown in FIG. 4, the locating lug means 38 are adapted to enter a spice 40 between the outer recessed portions 41 and 42 of the adjacent pipe flange faces. Normally, the lug means 38 are slightly narrower than the annular space 40 to prevent interference with the outer portions 41 and 42 of the flange faces. The locating lug means 38 permit the segments 13 and 14 to be self-aligning to a flange joint. The locating lug means 38, upon entrance into the space 40, align the plane of the associated segment 13 or 14 to the plane of the flange joint. This ensures that the arcuate gasket sections 29 will be properly seated on the outer cylindrical surfaces 43 and 44 of the pipe flanges 11 and 12. The locating lug means 38 also axially align the repair segments 13 and 14 so that the arcuate gaskets 29 will be positioned on both sides of the annular space 40 between the pipe flanges 11 and 12. When it is possible to align the segments to each other with fastening studs or some other means, the locating lug means 38 are eliminated from one segment or, alternatively, locating lug means are provided on only one end 39 of each segment 13 and 14.

The locating lug means 38 are particularly helpful during the manual positioning of large sealing and repair couplings. Repair couplings are commonly provided to seal flanges which are in the order of 3 feet in outside diameter. In these instances, the individual repair segments 13 and 14 are not easily managed by a workman. Moreover, visual alignment of the repair segments 13 and 14 to the joint may be difficult or impossible where a large quantity of fluid is escaping and the vapor or spray obstructs a workman's vision. These difficulties are largely eliminated by the lug means 38 of this invention, which require only that the repair segments be moved against the pipe flanges 11 and 12 until the lug means 38 index into the annular space 40.

It may be seen from FIG. 3 that the locating lug means 38 are located relatively close to the ends 39 of the repair segments 13 and 14. This forward location allows each segment 13 and 14 to be indexed or aligned to the flange joint relatively early as the segment is moved radially toward the joint. The locating lug means 38 are proportioned such that they do not normally enter the outer circle or zoned described by a radius from the center of a flange to the outer tangent of the flange holes 22. This permits the repair segments 13 and 14 to be located on the flange joint in any angular position without interference between a locating lug means 38 and a threaded stud 23.

In those instances where the flange holes 22 and threaded studs 23 are close to the outer surfaces 43 and 44 of the pipe flanges 11 and 12, or where it is desirable to provide radially extended locating lug means for earlier indexing to the flange joint, the individual cylindrical segments 13 and 14 are angularly aligned to the flange joint so that the locating lug means 38 do not interfere with the threaded studs 23. In flange joints where the gasket extends radially beyond the flange holes the locating lug means 38 are radially shortened so tat they do not harmfully cut into the gasket. Each of the locating lug means 38 is welded to the repair segments 13 and 14 in a manner which permits them to be removed with a chisel or other means in special circumstances where the lug means are not desired.

FIG. 5 shows the repair segment 13 installed on a flanged pipe joint formed by opposed pipe flanges 46 and 47. The length of this joint, defined by the outer cylindrical surfaces 48 and 49 of the pipe flanges 46 and 47 and the annular space 45 between these flanges, is somewhat less than the axial length of the repair segment 13. A comparison of FIG. 5 with FIG. 4, where the flanged joint is longer than the repair segment 13, shows that the sealing and repair coupling 10 of this invention may be used on joints of various lengths and that the function of the locating lug means 38, since the lug means cooperates with the center of the joint, is independent of such variations in length.

A flange 50 is provided at each end 39 of each repair segment 13 and 14. A hole 51 is provided in each flange 50 and, when the repair segments 13 and 14 are positioned around a flange joint, these holes 51 are in alignment. A threaded stud 52 is inserted in each pair of aligned holes 51. A pair of nuts 53 is provided with each stud 52 in order to draw the repair segments 13 and 14 tightly together. Upon tightening of the nuts 53, the arcuate gasket sections 29 provided in each of the repair segments 13 and 14 are brought into sealing engagement with the outer cylindrical surfaces 43 and 44 of the flanges. At the same time, each cross gasket 36 and the end faces 54 of each arcuate gasket segment 29 seal against the corresponding elements in the opposite segment. Thus, the gasket segments 29 and cross gasket 36 mechanically seal the periphery of the annular zone 40 between the flanges 11 and 12.

Referring now to FIG. 6, each repair segment 13 and 14 is provided with a plurality of fittings 56 through which pressurized fluid sealant may be admitted into the annular zone 40 between the the flanges 11 and 12. Each fitting 56 is threaded into a repair segment and connects with a radial bore 57 provided for each fitting and communicating with the annular zone 40 when the segment is installed on a flange joint. The fittings 56 are similar to grease fittings and have one-way check valves (not shown). A hand pump may be used to force pressurized sealant through these fittings 56 into the annular zone 40 between the flanges 11 and 12.

The fittings 56 permit the annular zones 40 to be sealed in successive angular sections corresponding to each fitting 56 to ensure that the entire zone 40 will be uniformly filled with sealant. A relief valve 58 may be provided in one of the segments 13 to allow leaking fluid to vent at a convenient point rather than at a random series of points about the circumference of the flange joint. When each of the fittings has been used to seal the zone 40, the relief valve 58 may be closed and plugged or replaced with an additional fitting 56.

When the sealant hardens it forms a permanent seal between the inner surfaces of the coupling segments 13 and 14 and the outer cylindrical surfaces 43 and 44 of the flanges. The pressurized sealant in the zone 40 will be carried axially along any clearance 59 between the threaded studs 23 and their associated flange holes 22 by the leaking fluid. The sealant closes these possible axial fluid escape paths.

The invention is not restricted to the slavish imitation of each and every one of the details set forth above. Obviously, devices may be provided which change, eliminate or add certain specific details without departing from the scope of the invention.

What is claimed is:

1. In a sealing and repair coupling for sealing fluid leakage in a joint defined by opposed pipe flanges having adjacent faces and each having a cylindrical outer surface, said joint being formed by first gasket means pressed between inner annular portions of said adjacent flange faces, the outer portions of said adjacent flange faces, the outer portions of said adjacent flange faces spaced apart, a plurality of aligned fastener holes in each flange, a fastener through each pair of aligned holes, said sealing and repair coupling sealing fluid leakage past said first gasket means and including a cylinder adapted to be positioned over each of said cylindrical outer flange surfaces, second gasket means between said cylinder and the cylindrical outer surface of each flange on both sides of the space between said outer flange portions, said second gasket means being compressed between an inner cylindrical surface of said cylinder and the outer cylindrical surface of said flanges, means for admitting pressurized fluid sealant into a zone defined by said cylinder, said first and second gasket means, said spaced apart outer portions of said flange faces and said holes whereby sealant may flow into a clearance between each fastener and each hole, the improvement comprising a sealing and repair coupling cylinder formed of at least two circular segments having an axial length substantially independent of the combined outer length of said flanges and the space therebetween, said segments providing self-aligning lug means extending radially inward from said inner cylindrical surface adapted to enter said space, said lug means being located substantially midway along the axial length of said segment, said second gasket means being provided on both axial sides of said lug means, said lug means being welded to said inner cylindrical surface in a manner which permits such lug means to be removed.

2. A sealing and repair coupling as set forth in claim 1 wherein said self-aligning means are provided at each of the arcuate ends of each of said segments.

3. A flanged pipe joint comprising flanges which include adjacent flange faces defining a joint between adjacent pipes, first gasket means pressed between inner annular portions of said flange faces, the remaining portions of said flange faces spaced apart, a plurality of aligned fastener holes in each flange, a fastener through each pair of aligned holes, said flanges having cylindrical outer surfaces, a pair of semicylindrical sealing and repair segments being fastened together around said flanges, second gasket means compressed between inner surfaces of said segments and the cylindrical outer surface of each flange, said inner surfaces, second gasket means, outer surfaces, remaining flange face portions, and said first gasket means enclosing an annular zone, each fastener and its associated holes defining clearance zones, means for admitting pressurized fluid sealant to said annular and clearance zones, each of said segments providing self-aligning lug means extending radially inward from its inner surface into the space between said remaining flange face portions, said self-aligning lug means terminating outside a circular zone described by a radius from the center of the flanges to the outer tangent of said fastener holes.

4. A flanged pipe joint as set forth in claim 3 wherein said self-aligning lug means are narrower than said space.

5. In a sealing and repair coupling for sealing fluid leakage in a joint defined by opposed pipe flanges having adjacent faces and each having a cylindrical outer surface, said joint being formed by first gasket means pressed between inner annular portions of said adjacent flange faces, the outer portions of said adjacent flange faces spaced apart, a plurality of aligned fastener holes in each flange, a fastener through each pair of aligned holes, said sealing and repair coupling sealing fluid leakage past said first gasket means and including a cylinder adapted to be positioned over each of said cylindrical outer flange surfaces, second gasket means between said cylinder and the cylindrical outer surface of each flange on both sides of the space between said outer flange portions, said second gasket means being compressed between an inner cylindrical surface of said cylinder and the outer cylindrical surface of said flanges, means for admitting pressurized fluid sealant into a zone defined by said cylinder, said first and second gasket means, said spaced apart outer portions of said flange faces and said holes whereby sealant may flow into a clearance between each fastener and each hole, the improvement comprising a sealing and repair coupling cylinder formed of at least two circular segments having an axial length substantially independent of the combined outer length of said flanges and the space therebetween, said segments providing self-aligned lug means extending radially inward from said inner cylindrical surface adapted to enter said space, said self-aligning lug means being proportioned so that their inner extremities are outside a circular zone described by a radius from the center of the flanges to the outer tangent of said fastener holes.

PO-1050
(5/69)

UNITED STATES PATENT OFFICE
CERTIFICATE OF CORRECTION

Patent No. 3,603,616                     Dated September 7, 1971

Inventor(s)  Joseph B. Smith

It is certified that error appears in the above-identified patent and that said Letters Patent are hereby corrected as shown below:

Column 1, lines 34, 35, and 36, cancel "Each semicylindrical segment carries a pair of semicylindrical segments which are fastened together around a leaking joint".

Column 1, line 41, the comma (,) which appears after "gaskets" should be a period (.).

Column 1, line 59, cancel "are" as it appears twice.

Column 3, line 19, "spice" should be -- space -- .

Column 3, line 73, "tat" should be -- that -- .

Column 4, line 36, cancel "the" as it appears twice.

Signed and sealed this 14th day of March 1972.

(SEAL)
Attest:

EDWARD M. FLETCHER, JR.                ROBERT GOTTSCHALK
Attesting Officer                       Commissioner of Patents